United States Patent
Pathak et al.

(10) Patent No.: US 11,243,597 B2
(45) Date of Patent: Feb. 8, 2022

(54) MICROPROCESSOR POWER LOGGING AT A SUB-PROCESS LEVEL

(71) Applicant: Apple Inc., Cupertino, CA (US)

(72) Inventors: Abhinav Pathak, Campbell, CA (US); Albert S. Liu, Sunnyvale, CA (US); Amit K. Vyas, San Jose, CA (US); Soren C. Spies, San Jose, CA (US); Matthew C. Widmann, Cupertino, CA (US); Prajakta S. Karandikar, Santa Clara, CA (US); Anand Subramanian, Santa Clara, CA (US); Anthony J. Chivetta, San Francisco, CA (US); Brian K. Tearse-Doyle, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 162 days.

(21) Appl. No.: 16/147,132

(22) Filed: Sep. 28, 2018

(65) Prior Publication Data
US 2019/0369705 A1 Dec. 5, 2019

Related U.S. Application Data

(60) Provisional application No. 62/679,894, filed on Jun. 3, 2018.

(51) Int. Cl.
| | |
|---|---|
| G06F 1/00 | (2006.01) |
| G06F 11/30 | (2006.01) |
| G06F 1/3228 | (2019.01) |
| G06F 11/34 | (2006.01) |

(52) U.S. Cl.
CPC ........ *G06F 1/3228* (2013.01); *G06F 11/3476* (2013.01)

(58) Field of Classification Search
CPC ................................................ G06F 1/3228
See application file for complete search history.

(56) References Cited

U.S. PATENT DOCUMENTS

| | | | |
|---|---|---|---|
| 5,694,607 A | 12/1997 | Dunstan et al. | |
| 2009/0300399 A1* | 12/2009 | Archer ..................... | G06F 11/30 713/340 |
| 2013/0132048 A1* | 5/2013 | Yamamoto ............ | G06F 11/302 703/2 |
| 2013/0212425 A1 | 8/2013 | Blaine et al. | |

(Continued)

*Primary Examiner* — Mohammed H Rehman
(74) *Attorney, Agent, or Firm* — Kowert, Hood, Munyon, Rankin & Goetzel, P.C.

(57) ABSTRACT

Techniques are disclosed performing a power logging in a computer system at a sub-process level. An exemplary method includes an operating system of the computer system determining process information indicative of which sub-portions of one or more processes are running on the computer system at different points in time, as well as may determining power information for the computer system at different points in time. The operating system may the create, from the process information and the power information, a power log indicative of power usage of sub-portions of processes at a plurality of points in time. The power logging may extend to both core and non-core resources of the system. For non-core resources, the power usage may be estimated in some cases based on the type of non-core resource being called as well as parameters passed to the non-core resource.

20 Claims, 8 Drawing Sheets

(56) References Cited

U.S. PATENT DOCUMENTS

| | | | |
|---|---|---|---|
| 2013/0332936 A1 | 12/2013 | Magee et al. | |
| 2014/0067295 A1* | 3/2014 | Putman | G06Q 50/06 |
| | | | 702/61 |
| 2015/0347262 A1 | 12/2015 | Vyas et al. | |
| 2016/0004577 A1* | 1/2016 | Geddes | G06F 9/542 |
| | | | 719/318 |
| 2016/0179157 A1* | 6/2016 | Ardanaz | G06F 1/3293 |
| | | | 713/340 |
| 2017/0083383 A1* | 3/2017 | Rider | G06F 9/5094 |
| 2017/0359348 A1* | 12/2017 | Ringer | H04L 67/42 |

\* cited by examiner

```
Power Log 600

Application 601: 5000 mW-sec: 100%

Process 610: 3000 mW-sec: 60%
        sub-portion 612: 1000 mW-sec: 20%
        sub-portion 614: 1200 mW-sec: 24%
            sub-portion 615: 700 mW-sec: 14%
            sub-portion 616: 500 mW-sec: 10%
        sub-portion 618: 800 mW-sec: 16%

Process 620: 2000 mW-sec: 40%
        sub-portion 622: 200 mW-sec: 4%
        sub-portion 624: 1800 mW-sec: 36%
            API Call 625: 100 mW-sec: 1%
            GPS 630: 1500 mW-sec: 30%
```

*FIG. 6*

```
Power Log 700

Application 701: 4000 mW-sec: 100%

Process 710: 2500 mW-sec: 62.5%
        sub-portion 712: 800 mW-sec: 20%
        sub-portion 714: 1000 mW-sec: 25%
            sub-portion 715: 600 mW-sec: 15%
            sub-portion 716: 400 mW-sec: 10%
        sub-portion 718: 700 mW-sec: 17.5%

Process 720: 1500 mW-sec: 37.5%
        sub-portion 722: 200 mW-sec: 5%
        sub-portion 724: 1300 mW-sec: 32.5%
            API Call 725: 100 mW-sec: 2.5%
            GPS 730: 1100 mW-sec: 27.5%
```

*FIG. 7*

MICROPROCESSOR POWER LOGGING AT A SUB-PROCESS LEVEL

PRIORITY CLAIM

This application claims the benefit of U.S. Provisional Patent Application No. 62/679,894, filed on Jun. 3, 2018, and whose disclosure is incorporated herein by reference.

BACKGROUND

Technical Field

This disclosure relates generally to computing devices, and, more specifically, to correlating power consumption to code execution in computing devices.

Description of the Related Art

Computing devices can typically execute a multiple software processes at a given time. A computing device may execute an operating system, including one or more background processes, as well as one or more applications. Power consumption may be determined based on various operations performed as a result of the execution of the multiple software processes. Reducing power consumption may often be a part of a debugging or program optimization effort.

SUMMARY

The present disclosure describes embodiments in which a computer system (e.g., using the operating system) determines process information indicative of which sub-portions of one or more processes (e.g., which functions in those processes) are running on the computer system at different points in time. The computer system also determines power information for the computer system at different points in time. The computer system may then create, from the process information and the power information, a power log indicative of power usage of sub-portions of processes at a plurality of points in time. In some cases, the power log may indicate power usage for both core resources (CPUs) and non-core (or non-CPU) resources (e.g., a wireless communication circuit). In some embodiments, core power usage may be determined by querying power state information for one or more processing cores in some embodiments, while non-core power usage may be determined by estimating power usage. Estimations of power usage may be based on, in some instances, the non-core resource being called and parameters associated with that call. This power logging functionality may, in some embodiments, be used to provide feedback for software developers, or to initiate a corrective action with respect to a particular process that exceeds a power threshold.

BRIEF DESCRIPTION OF THE DRAWINGS

FIG. 6 depicts a power log for an application.

FIG. 7 depicts a power log for an application that is revised based on the power log of FIG. 6.

Figure 1:
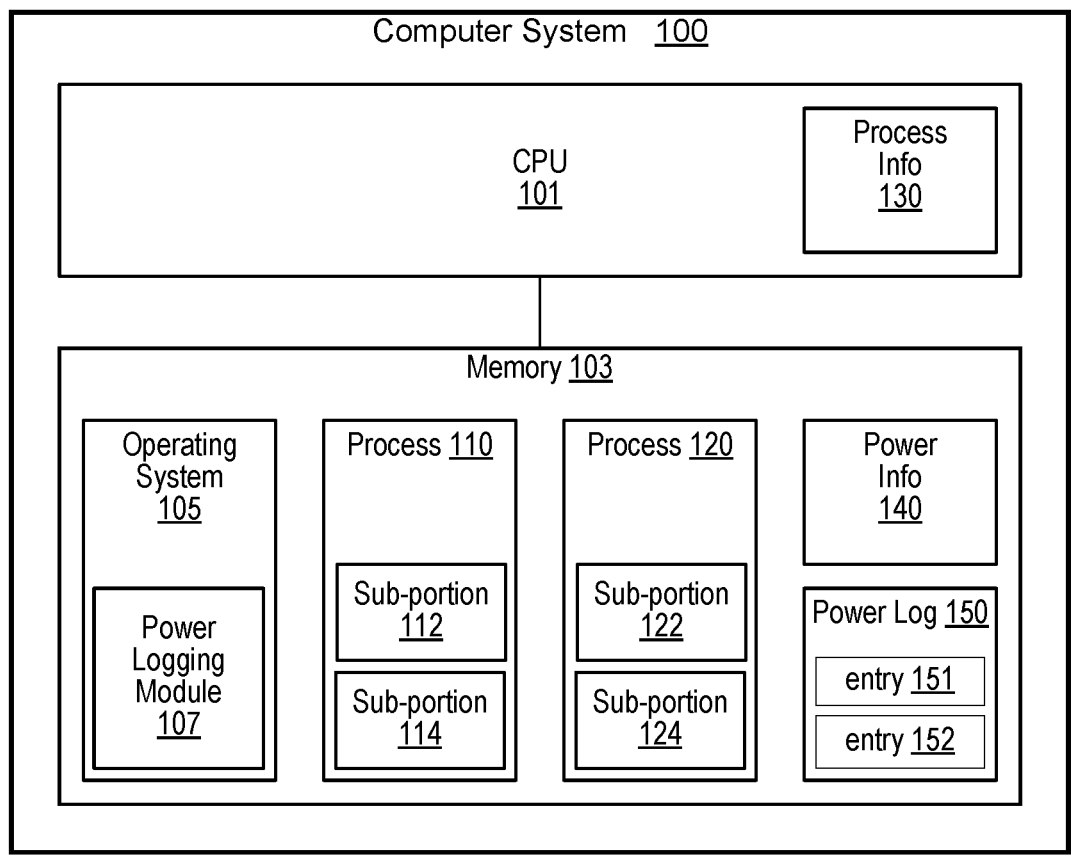
FIG. 1 illustrates a block diagram of an embodiment of a computer system capable of generating a power log.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION

Power consumption of a typical computing device is dependent upon which circuits of the device are active and an amount of activity in these circuits. Software being executed by the computing device may determine which of these circuits are active at a given time, as a particular software program may consume different amounts of power based on different code paths that are taken during program execution. For example, a game program may consume different amounts of power based on actions and decisions a user makes during the gameplay. These decisions can alter which processes are executed within the game program, thereby altering the power consumption at any particular point in time. Similarly, a navigation program may call different processes based on a route a driver takes as well as whether or not traffic or other information is included in the route information. Accordingly, power consumption of a particular process may be based on various code paths that are executed for that process, and particular sub-portions of processes (e.g., functions or subroutines) may have varying impacts on power consumption.

Understanding how software impacts power consumption may help to identify software bugs and allow developers to identify areas for optimization within a software program. The present inventors have recognized that it would be desirable to implement a power logging function for a computer system that can correlate power usage at a level of granularity that is within a process, referred to herein as a "sub-portion" of a process. Examples of a sub-portion of a process, which can be said to be at a "sub-process level," include functions that may be called within the process. This contemplated power logging function may also correlate power usage for both "core" (e.g., one or more CPU cores) and "non-CPU" resources. Non-CPU resources may also be referred to as peripheral processing circuits, and may include circuits such as a GPS circuit, short-range communication circuit (e.g., Bluetooth or WiFi), cellular communication circuit, a digital signal processor, a security processor, and the like. The power logging function, which may be implemented within an operating system of a computer system, may correlate which sub-portions of processes are running at a particular time with corresponding power usage. In some cases, power usage for core resources may be determined using state information such as frequency and voltage of the core resources, while power usage for non-CPU resources may be determined based on an estimation of power usage. For example, if a call to a GPS API is detected, the power logging function may estimate an amount of power usage by the GPS for that call. In some cases, this estimation may be based on an argument for the call—for example, an amount of data to be processed by the non-CPU resource.

This power logging function, which may be implemented within an operating system in some embodiments, may provide various benefits, including enhancing a developer's ability to identify opportunities for reducing power consumption of a software program. A power log could also be used to manage power consumption during usage of a computing device. For example, in some cases, a process having a sub-portion that exceeds some predetermined power threshold could either be reported to the user or preemptively disabled—for instance, at times when power consumption is already high or when a power supply, such as a battery, is limited.

As used herein, references to "power," such as "power logging" are to be understood to include both power and the related concept of energy. Because power may be expressed as energy per unit of time, and energy may be expressed as cumulative power over a time period, the present disclosure contemplated that a "power log" may include an indication of power and/or energy.

A block diagram of an embodiment of a computing device with power logging capabilities is illustrated in FIG. 1. Computer system 100 may correspond to any suitable type of computer system. Accordingly, computer system 100 may be a mobile device (e.g., a mobile phone, a tablet, personal data assistant (PDA), laptop, etc.), desktop computer system, server system, network device (e.g., router, gateway, etc.). As shown, computer system 100 includes central processing unit (CPU) 101 and memory 103. CPU 101 executes computer instructions for operating system 105 as well as processes 110 and 120.

Memory 103 includes one or more storage devices that collectively form at least a portion of a memory hierarchy that stores data and instructions for computer system 100. Memory 103 is used to store instructions and data corresponding to operating system 105, which includes power logging module 107, which includes code for tracking and logging power consumption of various processes executed by CPU 101. During operation of computer system 100, memory 103 further store processes 110 and 120, each of which includes respective sub-portions, sub-portions 112 and 114 in process 110, and sub-portions 122 and 124 in process 120.

CPU 101 may, in various embodiments, be representative of a general-purpose processor that performs computational operations, and may include one or more processing cores. As shown, CPU 101 executes operating system 105, including power logging module 107, as well as processes 110 and 120. Processes 110 and 120 may correspond to respective applications or may each comprise a portion of one application. Processes 110 and 120 may, in some embodiments, provide support for other applications, such as, for example, as software drivers for the other applications to access particular hardware or features of computer system 100.

Software processes executed on computer system 100 are subdivided into various sub-portions, such as sub-portions 112, 114, 122, and 124. In various embodiments, sub-portions may correspond to subroutines, functions, objects, or other suitable modules as determined by a programming language used to create a particular process. In general, sub-portions are intended to connote some code portion that is a subset of the code of the larger process. A main process may provide an initial execution point for an application and sub-portions are called from this main process. An executing sub-portion may call further sub-portions. When a sub-portion is complete, code execution may return to the calling sub-portion. To keep track of which sub-portion calls another sub-portion, CPU 101 maintains a memory structure referred to as a "stack," and adding data to the stack is referred to as "stacking." As a calling sub-portion calls, and subsequently relinquishes program control to another sub-portion, CPU 101 stores information about the calling sub-portion in the stack, such as, for example, a return address corresponding to an instruction after the call to the other sub-portion. In some embodiments, other information relating to the calling sub-portion and/or to register states at the time the sub-portion call is executed may be included in the stacked information. Process information 130 corresponds to process information stored in the stack.

CPU 101, as shown, may operate in one of a plurality of power states at any given time. When a work load for CPU 101 is low, e.g., few processes are active and any active processes don't require much of the processing bandwidth of CPU 101, then a reduced power state may be selected by operating system 105. A reduced power state may include selecting a reduced voltage level for one or more power supply signals to CPU 101 and/or a reduced frequency for one or more clock signals provided to CPU 101. When a process requires more bandwidth, or more processes become active (e.g., an application is started), operating system 105 may put CPU 101 into a higher performance power state by increasing a voltage level of a power supply signal and/or a frequency of a clock signal, thereby increasing the processing bandwidth of CPU 101 at the cost of increased power consumption. Operating system 105 maintains a value of the current operating state, and in some embodiments, may store a time-stamped log of changes to the power states of CPU 101. Power information 140, as illustrated, is an example of a log of changes to power states of CPU 101.

As illustrated, power logging module 107 includes instructions for generating power log 150. Power log 150 includes a plurality of entries (151 and 152), in which each entry indicates power consumption of a particular sub-portion of a process at one or more points in time. To generate power log 150, operating system 105 determines process information indicative of which sub-portions (e.g., 112, 114, 122, 124) of one or more processes (e.g., 110, 120) are running on CPU 101 at different points in time. As shown, operating system 105 determines process information by reading process information 130 from a stack in CPU 101 in a process referred to herein as a "stack trace." To perform a stack trace, operating system 105 reads one or more entries from the stack, collecting at least return address information from respective entries. Since each entry may correspond to a call to a sub-portion, return addresses may be used to trace program execution through various sub-portion calls, thereby determining a path from an active sub-portion back to the main process.

Operating system 105, in some embodiments, may perform a stack trace at a regular interval. In some embodiments, the interval may correspond to a set amount of time, e.g., 100 milliseconds (ms). Using a time interval, however, may result in stack traces being captured after various numbers of instruction cycles since a clock signal frequency may vary over time based on the current power state. In other embodiments, therefore, the interval between capturing stack traces may correspond to a number of instruction cycles, e.g., 10,000 cycles. Using instruction cycles rather than a set amount of time for the deltas may provide more consistency between each stack trace. Stack traces that are performed at a regular interval, whether that interval is time-based, instruction-cycle-based, or using some other metric, are said to be "synchronous" stack traces within the context of the present disclosure.

As depicted, operating system 105 determines power information for computer system 100 at different points in time. In some embodiments, operating system 105 may capture or log power state information for CPU 101 at a synchronized interval, such as, for example, the same points in time as when the stack traces are performed. As depicted herein, operating system 105 logs changes in power states, including a power supply voltage level and a clock signal frequency, after each power state change and stores this information in power information 140. The points in time corresponding to the entries in power information 140 may not coincide with the same points in time as when the stack traces are performed. The power signal voltage levels and clock signal frequencies, however, may remain relatively consistent between power state changes. In some embodiments, however, operating temperatures and a current state of a power source (e.g., a current charge level of a battery) may affect power signal voltage levels and clock signal frequencies. In such embodiments, additional information concerning current conditions such as temperature and battery state may additionally be captured.

Using process information 130 and power information 140, operating system 105 may create power log 150, indicating power consumption of sub-portions of processes at a plurality of points in time. Power log 150 includes power log entries 151 and 152, each entry indicating power consumption over a range of time that includes at least one particular point in time. Power log entry 151, for example, may correspond to a determined power consumption of sub-process 114 at a particular point in time, or may correspond to an average power consumption of sub-process 114 over a range of time. In other embodiments, in place of, or in combination with average power consumption, power log entry 151 may include a value indicative of an amount of energy used by sub-process 114 over the range of time.

It is noted that the block diagram of FIG. 1 is merely one possible example of a system that can perform power logging at a sub-process level. Modern computer systems include a variety of circuitry, including those than can be considered core resources and those that can be considered non-core resources. Embodiments of computer system that can perform power logging for non-core resources (either in combination with core power logging at the sub-process level) are illustrated next with reference to FIG. 2.

Figure 2:
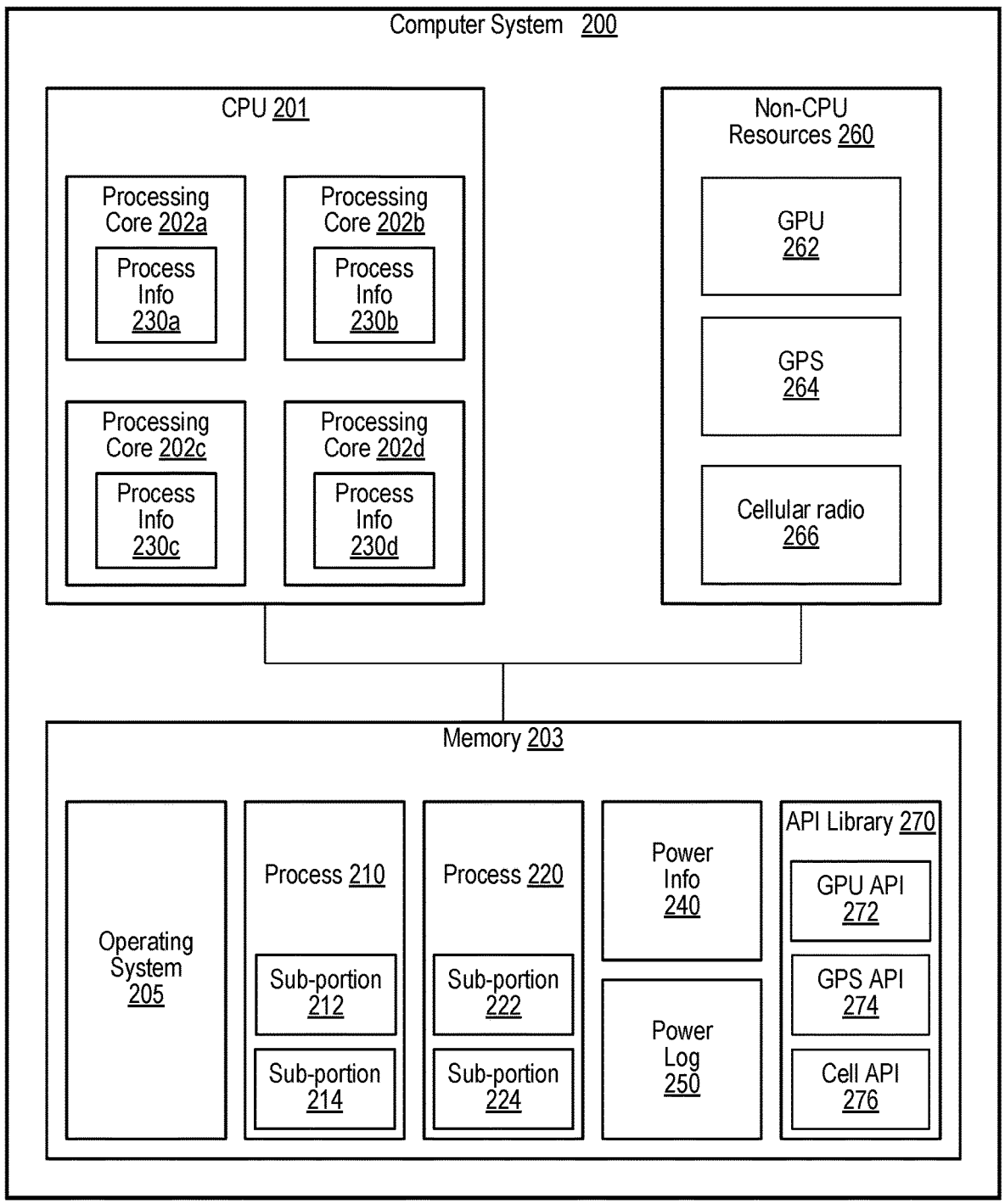
FIG. 2 shows a block diagram of another embodiment of computer system capable of generating a power log that further includes power from non-CPU resources.

Turning now to FIG. 2, a block diagram of an exemplary computing device with power logging capabilities is shown. Computer system 200 may, in some embodiments, correspond to computer system 100 of FIG. 1. As illustrated, computer system 200 includes CPU 201 (or "core resources"), memory 203, and non-CPU resources 260 (which may also be referred to as "non-core resources"). CPU 201 includes four processing cores, processing core 202a-202d (collectively referred to as processing cores 202), each processing core 202 including a respective stack capable of storing process information 230a-230d. Non-CPU resources 260 includes peripheral circuits which may be utilized by processes executing in CPU 201 to send, receive, or otherwise manipulate data used by the respective processes. Non-CPU resources 260 includes: graphics processing unit (GPU) 262, global positioning system (GPS) 264, and cellular communications radio circuit (cellular radio) 266. Memory 203, similar to memory 103, stores operating system 205, processes 210 and 220, power information 240, and power log 250. In addition, memory 203 includes a library of application programming interfaces (API library) 270. API library 270 includes a plurality of programming interfaces including, but not limited to, GPU API 272 for interfacing with GPU 262, GPS API 274 for communicating with GPS 264, and cell API 276 for communicating with cellular radio 266.

CPU 201 corresponds to any suitable type of central processing unit for computer system 200, such as, for example, a microprocessor, a microcontroller, an application-specific integrated circuit (ASIC), or a field-programmable gate array (FPGA). Processing cores 202a-202d in CPU 201 may, in various embodiments, be representative of a general-purpose processor core that performs instructions for a particular instruction set architecture (ISA), such as, e.g., ARIVI™, PowerPC®, Blackfin®, or x86 ISAs, or combination thereof. As depicted, memory 203 may be representative of memory devices in the dynamic random access memory (DRAM) family of memory devices or in the static random access memory (SRAM) family of memory devices, or in some embodiments, a combination thereof.

CPU 201 executes operating system 205 using one or more of processing cores 202. As presented, operating system 205 provides an interface between software applications (e.g., process 210 and process 220) that may run on computer system 200 and non-CPU resources 260. During the execution of operating system 205, non-CPU resources 260 are utilized via use of APIs in API library 270. Operating system 205 or another application running on CPU 201 may enable non-CPU resources 260 by calling a corresponding API. GPU API 272, for example, is called to enable functionality of GPU 262. Values included in an API call may perform various functions for the corresponding non-CPU resource 260, including enabling or disabling the resource, as well as sending, receiving, or processing data using these resource circuits. For example, an initial call to GPS API 274 may enable GPS 264 and return an indication when GPS 264 has been enabled and is capable of receiving GPS coordinates. Another call to GPS API 274 may request current coordinates or may instruct GPS 264 to obtain current coordinates at a specified time interval. A final call to GPS API 274 may disable GPS 264.

Power consumption within computer system 200 is dependent on one or more voltage levels provided to various circuits and frequencies of one or more clock signals provided to these circuits. For example, the power states described above may, in computer system 200, be independently assigned to each of processing cores 202. Processing core 202a, for example, may be operating in a high-performance power state with both a power signal voltage level and a clock signal frequency set to respective high values, while the remaining processing cores 202 are in reduced power states with lower power signal voltage levels and lower clock signal frequencies.

Certain circuits may have a bigger impact on power consumption than others. In addition to power consumed by processing cores 202, power consumption of computer system 200 may be dependent on power consumption of particular hardware circuits such as, for example, the illustrated non-CPU resources 260 (GPU 262, GPS 264, and cellular radio 266) as well as any other suitable circuits that may utilize high frequencies and/or high current circuits.

Accordingly, software applications and other processes that cause processing cores 202 to move from reduced power states to higher performance states result in increased power consumption in computer system 100. Additionally, processes that enable and utilize non-CPU resources 260, also increase power consumption in computer system 200. To reduce power consumption, a software developer may, therefore, want to identify an amount of power a sub-portion of a particular process consumes, or identify sub-portions of any processes that consume more power than other processes. Identifying power consumption of sub-portions, even down to a line of code, allows a software developer to identify opportunities to fix a software bug or optimize code to reduce the identified power consumption.

Similar to the description above for FIG. 1, operating system 205 creates an entry for power log 250 by performing stack traces for each processing core 202 at regular intervals to determine a particular sub-portion of a process that is active on each processing core 202. The stack traces performed at these regular intervals are referred to herein as "synchronous stack traces." This process information 230 is combined with power information 240 for each respective processing core 202 to determine a power consumption value at a particular point in time corresponding to when the stack trace is performed. An entry in power log 250 may, in some cases, be created based on the power consumption values from one or more consecutive points in time.

To determine particular process information, operating system 205 may determine which sub-portions of processes 210 and 220 are running on which of processing cores 202. At a scheduled point in time for performing a stack trace, operating system 205, as depicted, performs a stack trace for each of processing cores 202 that are actively executing at least a sub-portion of a process, thereby retrieving at least one stack entry from at least one of process information 230a-230d for each active processing core 202. The collected entries from process information 230a-230d may be used to identify which of sub-portions 212, 214, 222, and 224 are running on which of processing cores 202. Operating system 205 may individually select a power state for each of processing cores 202 based on a workload for each core, and this power state information is stored in power information 240 for each processing core 202. Power information 240 can be retrieved for processing cores 202 that correspond to the active sub-portions and power consumption values can then be determined for each active sub-portion.

In addition to performing the synchronous stack traces at regular intervals to determine process information for a sub-portion running on a processing core, operating system 205 may additionally perform stack traces upon detecting a beginning and an end of usage of a non-CPU resource 260. These additional stack traces are referred to herein as "asynchronous stack traces." The APIs for the non-CPU resources 260 may include one or more lines of code that, when executed as part of an API call, trigger operating system 205 to perform one or more asynchronous stack traces.

In addition to performing an asynchronous stack trace in response to the API call, operating system 205 determines a power consumption value corresponding to the usage of the called non-CPU resource 260. Power consumption of a particular non-CPU resource 260, e.g., GPS 264, may be estimated based on a typical power consumption when GPS 264 is enabled, or, in some embodiments, may be based on a parameter associated with the power consumption of GPS 264. For example, an estimated power consumption of GPS 264 may be stored in a table in memory 203 or elsewhere in computer system 200, while an estimated power consumption of cellular radio 266 may be based on an amount of data included in a particular call to cell API 276.

As shown, operating system 205 adjusts entries of power log 250 that occur during usage of one of non-CPU resources 260, based on the estimated power consumption of the non-CPU resource 260. After a value for the power consumption of the non-CPU resource 260 is determined, this value may be added to particular entries of power log 250. The particular entries may correspond to entries associated with a sub-portion which called the API for the non-CPU resource 260. For example, if sub-portion 222 initially calls GPU API 272 to enable GPU 262, and further includes one kilobyte of data with this or additional API calls before calling GPU API 272 for a last time to disable GPU 262, then the power consumption value estimated for this usage of GPU 262 is added to any entries in Power Log 250 associated with sub-portion 222 during the time frame from the initial call to GPU API 272 through to the last call to GPU API 272.

In some embodiments, operating system 205 may provide an interface that permits selection of non-CPU resources 260 for which power information is to be tracked. One or more of the APIs in API library 270 may include enabling code sections to call a power estimation function that estimates the power consumption value for the corresponding non-CPU resource 260. Selection of the non-CPU resources 260 to include in power log 250 may be configurable by a software developer and/or by an end-user of computer system 200. In addition, the non-CPU resources 260 that are selectable to be included in the entries of power log 250 may be limited to non-CPU resources that are known to consume more than a particular amount of power. Such non-CPU resources may, in some cases, be high-power, or energy heavy resources. In these cases, such non-CPU resources would be of particular interest to software developers interested in power efficiency.

Power log 250 may be used, in some cases, by a software developer to identify software bugs that result in unexpectedly high power consumption or to identify parts of a software program or process that can be optimized to reduce power consumption. Alternately or additionally, operating system 205 may provide a user-visible indication of a process that exceeds a power threshold to a user of computer system 200. This may allow a user to take a corrective action, such as disabling the process. The operating system may in some cases take this action without receiving explicit user authorization.

In some cases, operating system 205 may send information in power log 250 to a database system external to computer system 200. This database system may be configured to receive information from power logs of various computer systems that are running similar versions of operating system 205. In this manner, power usage information may be aggregated across numerous computer systems, which may help in identifying power usage trends or bugs.

Additional details regarding how data captured in power log 169 is used are described below in regards to FIG. 5.

It is noted that the block diagram of FIG. 2 is one example for demonstrative purposes. In other embodiments, computer system 200 may include additional and/or different functional circuits including, for example, additional non-CPU resources such as a displays, audio processing circuits, audio amplifiers, short and medium range communication circuits (e.g., Bluetooth, WiFi, ZigBee), digital signal processors, security processors, camera circuits, lighting circuits (e.g., an LED camera flash), and any other suitable circuits that may have at least brief levels of high power consumption. Although four cores are shown in the CPU, any suitable number of cores may be included in other embodiments.

Figure 3:
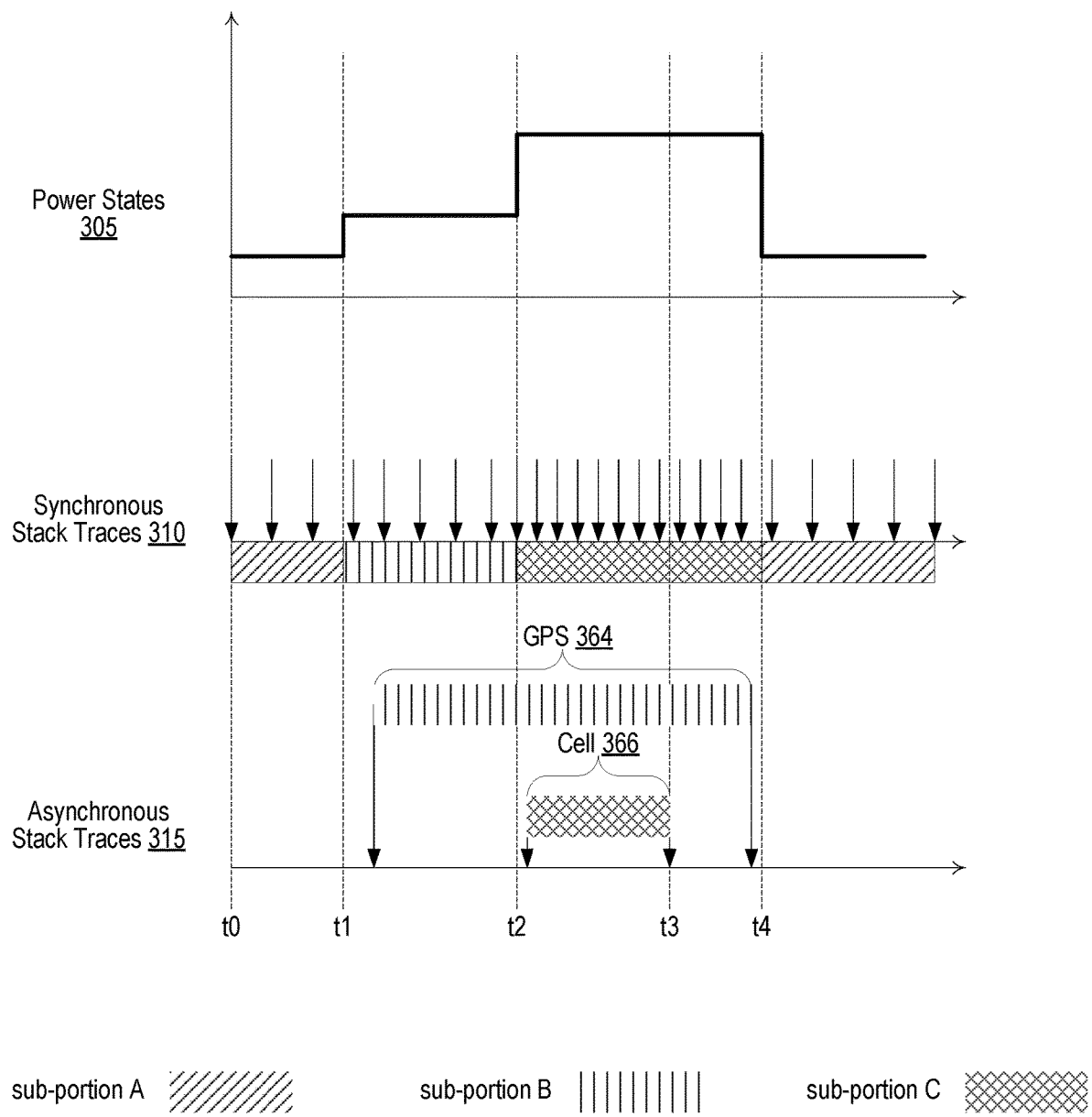
FIG. 3 depicts three charts depicting three forms of information determined by an operating system to generate a power log.

Power calculations based on power states, synchronous stack traces preformed at regular intervals, and asynchronous stack traces performed in response to certain API calls are described above. Turning now to FIG. 3, three charts are illustrated to further demonstrate how these three types of information may be used to estimate power consumption for a sub-portion of a software program running on a computing device, such as, for example, computer system 200 in FIG. 2. The three charts include power states 305, synchronous stack traces 310, and asynchronous stack traces 315. Power states 305 depicts a particular power consumption level of a processing core, e.g., processing core 202*a*, versus time. Synchronous stack traces 310 depicts a timeline indicating points in time at which stack traces are performed at regular intervals. In addition, cross-hatched bars below the arrows (the arrows indicating the points in time) provide an indication of the active sub-portion indicated by the corresponding stack traces. Asynchronous stack traces 315 illustrates another timeline indicating points in time at which a stack trace is performed in response particular API calls.

At time t0, processing core 202*a* is in a reduced power state, as shown in power states 305. In this reduced power state, a voltage level of a power signal and a frequency of a clock signal may both be lowered to conserve power as compared to other higher-power states. As illustrated, stack traces are performed on a regular interval based on a number of instruction cycles. As a result, a frequency of stack traces is determined by the lowered clock signal frequency, illustrated in synchronous stack traces 310 between times t0 and t1. In addition, as shown by asynchronous stack traces 315, no stack traces are performed in response to an API call. An entry into power log 250 may be created during this time period, based on one or more sub-portions running on processing core 202*a* during this time period. In this example, sub-portion A is indicated as the active sub-portion during the t0 to t1 time period.

To create an entry in power log 250, operating system 205 may include correlating the power information corresponding to power states 305 during the range in time from t0 to t1 with the process information for sub-portion A during this range in time. The power log entry for time t0 to t1 may, therefore, include the three points in time during this range from t0 to t1.

At time t1, processing core 202*a* enters a higher power state, as indicated by Power states 305. This higher power state includes an increased clock signal frequency and may also include a higher power signal voltage level. As a result of the increase to the clock signal frequency, a rate for performing stack traces increases between time t1 and time t2, as shown by synchronous stack traces 310. Sub-portion B is indicated as the active process during the t1 to t2 time period, and a corresponding entry into power log 250 may include the five points in time between times t1 and t2. Shortly after time t1, as indicated by asynchronous stack traces 315, a sub-portion B calls an API to enable a non-CPU resource, GPS 364, which may correspond to GPS 264 in some embodiments. An additional stack trace is performed in response to the API call. As shown, this additional stack trace identifies sub-portion B as calling the API to enable GPS 364. In addition, a power estimate corresponding to power consumed by GPS 364 is determined and added to power log entries for sub-portion B until another API call that disables GPS 364 is detected.

As indicated by power states 305, at time t2 processing core 202*a* enters a still higher power state. The clock signal frequency is increased and the voltage level of the power signal may also be increased. The rate for performing the regular interval stack traces again increases due to the increased clock signal frequency from times t2 to t4. During this range of time from t2 to t4, sub-portion C is indicated as the active sub-portion in processing core 202*a*. Shortly after time t2, another API call is detected, this time to enable cell 366 (which may, in some embodiments, correspond to cellular radio 266 in FIG. 1). Another stack trace is performed which, as illustrated, identifies sub-portion C as enabling cell 366. An additional power estimate corresponding to power consumed by cell 366 is determined and may be added to entries in power log 250 that correspond to sub-portion C. This additional power estimate is added until time t3, when another API call is detected that disables cell 366. In some embodiments, the power estimate corresponding to cell 366 may be adjusted based on an amount of data included in one or more API calls for cell 366. Similarly, an API call for GPS 364 is detected just before time t4 that disables GPS 364. The additional power estimate corresponding to GPS 364 may no longer be added to any power log entries after time t3.

At time t4, processing core 202*a* returns to the same power state used at time t0, resulting in a lower clock signal frequency and lower voltage level of the power signal. The rate for performing the regular intervals is reduced due to the lower clock signal frequency. No further API calls that trigger additional stack traces are detected through the end of the illustrated charts. Sub-portion A is again indicated as the active sub-portion after time t4 to the end of the charted time.

Figure 4:
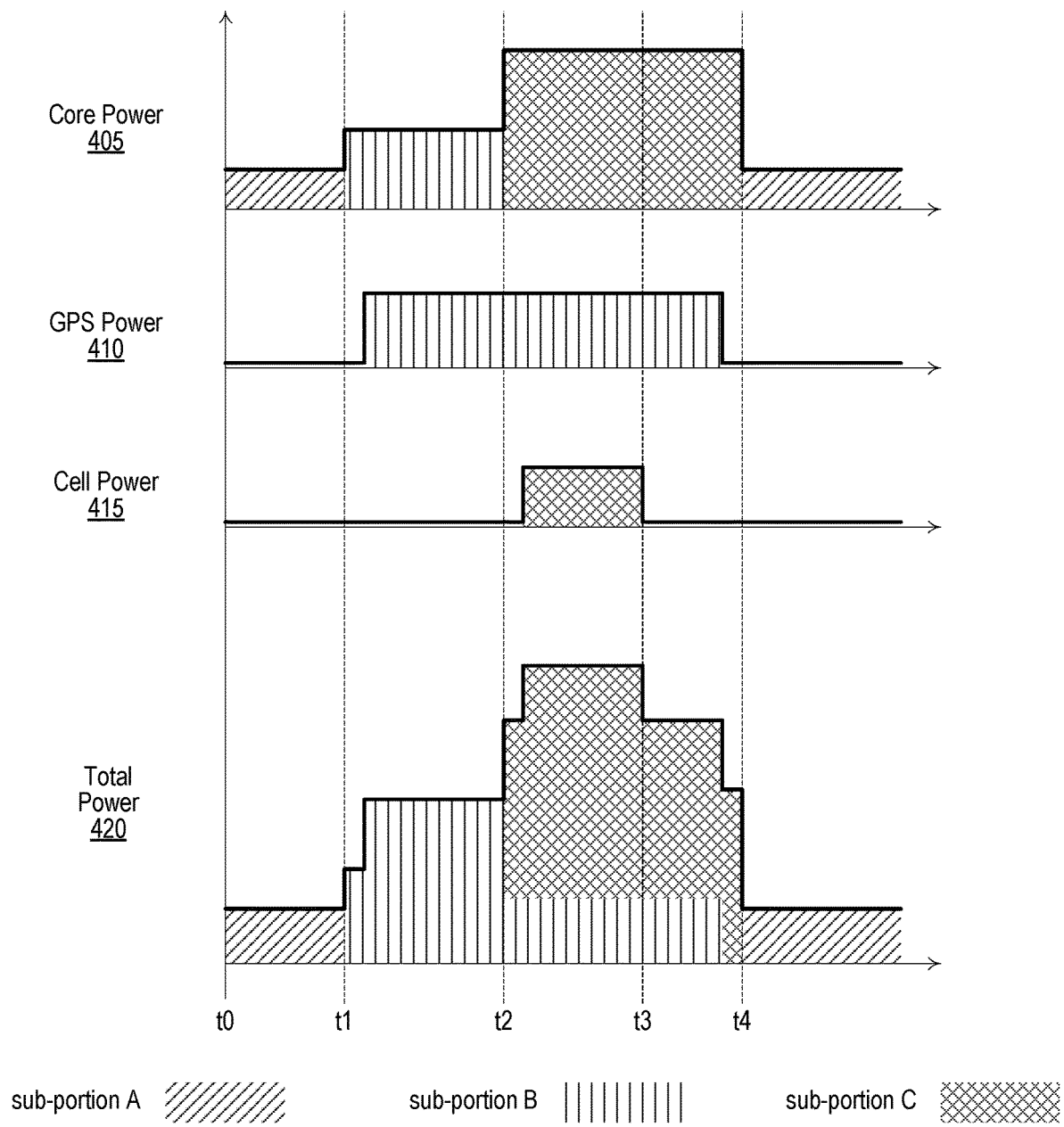
FIG. 4 illustrates four charts that show various forms of power data.

It is noted that FIG. 3 is just one example for demonstrating the disclosed concepts. The relative power states and timings are presented in a simple format for clarity. Actual rates for performing stack traces and actual differences in power states may differ in other embodiments. The charts of FIG. 3 illustrate a relationship between power state changes, and a plurality of points in time at which stack traces are performed as part of either a regular interval or in response to an API call. FIG. 4 further demonstrates how this collected information may be combined to generate entries in a power log.

Moving now to FIG. 4, four charts are shown that depict how power estimates may be determined and combined to create a power consumption value for a sub-portion of a software program running on a computing device, such as, for example, Computer System 200 in FIG. 2. The four charts include core power 405, GPS power 410, cell power 415, and total power 420. Core power 405 depicts power values versus time for a particular processing core, such as, for example, processing core 202*a* in FIG. 2. Core power 405 also indicates which sub-portion the power value is assigned to during a particular time period, one of sub-portions A, B, or C, as indicated by a particular cross-hatching. GPS power 410 and cell power 415 depict power values versus time for a GPS radio circuit and a cellular radio circuit, such as, for example, GPS 264 and cellular radio 266, respectively. Total power 420 illustrates a summation of the other three charts as well as the indication of the active sub-portion. The four charts of FIG. 4, as shown, correspond to power values determined based on the results of the information from the charts of FIG. 3.

In the range of time from t0 to t1, core power 405 is the predominate source of power consumption in computer system 200 and is attributed to sub-portion A based on stack traces performed, as indicated by synchronous stack traces 310 in FIG. 3. GPS 264 and cellular radio 266 may be disabled or otherwise idle and, therefore, do not contribute significant power consumption to total power 420. Total power 420, therefore, is reflective of core power 405 during this range of time. As depicted, upon determining a range of time during which sub-portion A is active on processing core 202*a*, e.g., the range from time t0 to t1, operating system 205 determines power info for processing core 202*a* during this determined range in time based on voltage level and clock frequency information for processing core 202*a* during this time range.

To determine a value for core power 405 at a given point in time, operating system 205 retrieves power state information for processing core 202*a* at the given point in time and converts the corresponding power signal voltage level and clock signal frequency into a power consumption value. Operating system 205 may utilize one or more equations to convert the voltage and frequency values into a power value or may use the voltage and frequency values to access a lookup table that stores power consumption values. The power consumption values may be based on power simulations run on a model of computer system 200 (or a portion thereof, such as CPU 201, for example) or may be based on power values determined from evaluations of computer system 200 or portions of its hardware (e.g., power evaluation of an integrated circuit corresponding to CPU 201).

Moving to the next range of time, from time t1 to t2, core power 405 increases as sub-portion B becomes active. In addition, shortly after time t1, GPS 264 is enabled, based on an API call from sub-portion B. As shown by GPS power 410, the power consumed by GPS 264 is attributed to sub-portion B until another API call, just before time t4, disables GPS 264. Total power 420 during the range in time from t1 to t2 is, therefore, attributed to sub-process B and includes both power values for core power 405 and GPS power 410.

At time t2, sub-portion C becomes active and core power 405 increases again. Sub-portion C remains active until time t4. Cellular radio 266 is enabled shortly after time t2 by sub-portion C. Total power 420 during this range in time includes power values for core power 405 and cell power 415, both attributed to sub-process C. Power from GPS power 410 is also added to total power 420. As illustrated, however, the GPS power remains attributed to sub-process B, even though sub-process C is currently active. In other embodiments, power contributed by GPS 264 after time t2 may attributed to the active sub-portion, sub-portion C.

Cellular radio 266 is disabled at time t3, and total power 420 is decreased accordingly. At time t4, sub-process A becomes active again and core power 405 is also reduced. GPS power 410 and cell power 415 may both be at negligible levels after time t4. Total power 420, therefore, is based on core power 405 and attributed to sub-process A.

It is noted that FIG. 4 is one example. The relative power levels and timings presented in the illustrated charts are simplified for clarity. Actual power levels when transitioning between different power levels may not rise and fall as sharply as shown.

The charts of FIGS. 3 and 4 demonstrate how a power log may be generated. Turning to FIG. 5, a block diagram is presented to illustrate how a power log may be used.

Figure 5:
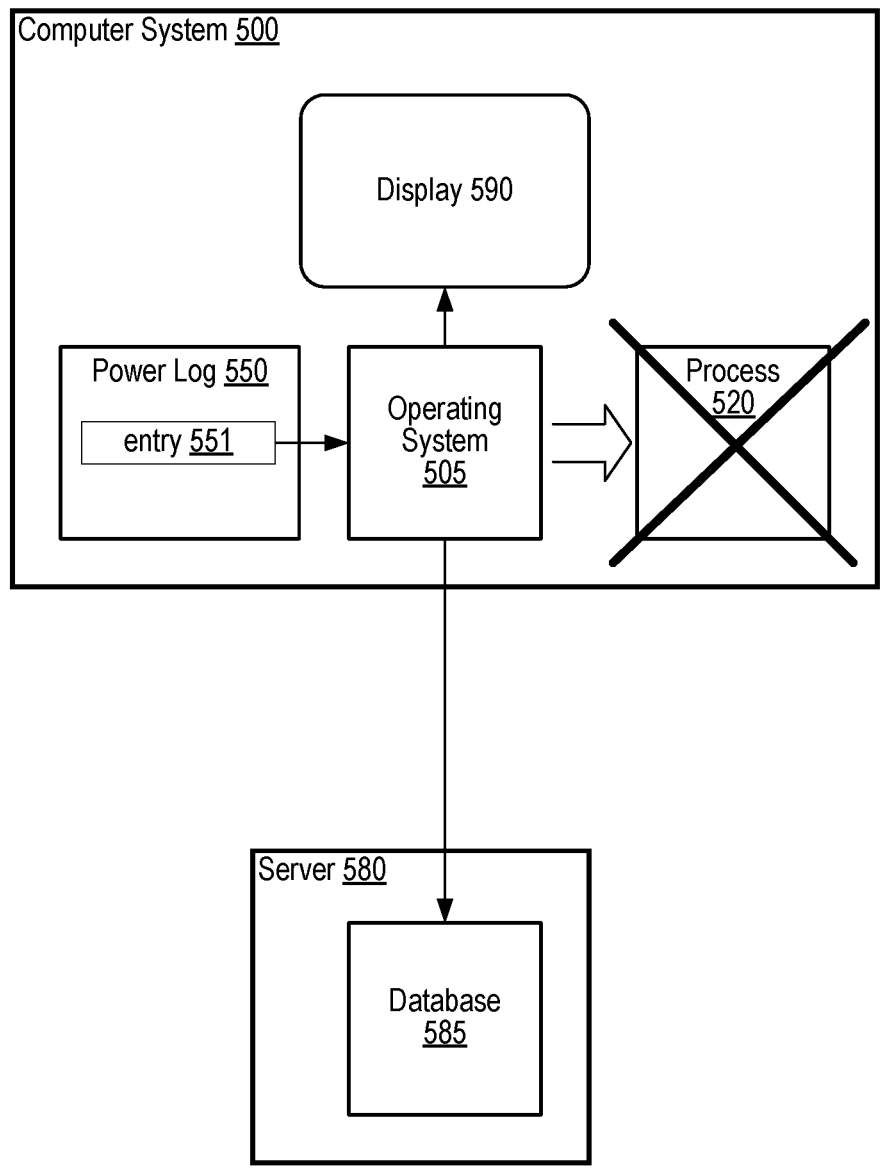
FIG. 5 shows a block diagram of embodiments of a computer system and a server.

FIG. 5 shows a block diagram that includes an embodiment of a computer system and an embodiment of a server. Computer system 500 may correspond to computer system 200 of FIG. 2. As illustrated computer system 500 stores power log 550, including entry 551. Operating system 505 is executing on computer system 500 as is process 520. Display 590 is included in computer system 500. Computer system 500 is coupled to server 580, which further includes database 585.

After power log 550 is generated, as described above, one or more entries, including entry 551 are sent to server 580 to be stored in database 585. As illustrated, computer system 500 may be coupled to server 580 in any suitable way, such as, for example, via the Internet using a WiFi, cellular data, or Ethernet connection. Computer system 500 may send entries of power log 550 at certain intervals of time and/or in response to a particular event, such as a value of entry 551 exceeding a predetermined threshold. In various embodiments, a threshold may be set by operating system 505 for all entries in power log 550, or by a particular process, such as, e.g., process 520. Process 520 may set a threshold for power log entries that correspond to process 520. For example, a software developer may set a particular threshold at a level that process is not expected to exceed or for which the developer otherwise has an interest in gathering data.

Server 580, after receiving the entries of power log 550, stores the entries in database 585. In addition to computer system 500, server 580 may be coupled to other computer systems that are also capable of generating power logs. Database 585 may include power log data associated with a particular process or application, or may include power log data for all computer systems executing a similar version of operating system 505. A developer of process 520, or of operating system 505, may be alerted when server 580 receives power log entries, or the alert may occur at regularly scheduled intervals, or upon receiving a threshold amount of power log entries. Such an alert may include an email or other electronic document summarizing data received in the power log entries. In other embodiments, the developer may be responsible for accessing the database 585 in a suitable fashion.

In some embodiments, a particular entry, such as entry 551, may be retrieved by operating system 505 if the associated power consumption value exceeds a threshold value. Operating system 505 may then make a determination if the corresponding process, e.g., process 520, or a sub-portion of process 520, is to be stopped due to excessive power consumption. In such embodiments, operating system 505 may consider current operating parameters, such as, for example, a temperature associated with computer system 500, and/or a voltage level or current of a power supply for computer system 500. Entry 551 may be compared to other previously logged entries corresponding to the same sub-portion of process 520 to determine if the value of entry 551 deviates by more than an acceptable amount from the previous values. In some embodiments, in addition to, or instead of, stopping process 520, operating system 505 may display an indication to a user via display 590. In some embodiments, the user may be given an option whether to terminate process 520.

It is noted that the embodiment of FIG. 5 is one of many examples illustrating a potential usage of the power logs described above. It is contemplated that other similar usages may be enabled in other embodiments. FIG. 5 describes a method for communicating a power log to a software developer or user. FIGS. 6 and 7 describe an embodiment of how logged information may be presented.

Moving to FIGS. 6 and 7, two depictions of a power log as presented to a developer are illustrated. FIG. 6 shows power log 600 for application 601. FIG. 7 illustrates power log 700 for application 701, which, as depicted, is a revised version of application 601. Power log 600 may be created, based on inputs from a developer, in order to identify opportunities to improve energy usage in application 601. Power log 700 may be created in order to evaluate how well changes from application 601 conserve energy in application 701.

In the embodiment shown, power log 600 includes energy usage information collected for application 601 over a particular period of time. The energy usage information is presented in two formats, as an equivalent number of milliwatt-seconds (mW-sec), i.e., a number of milliwatts used over a second of time, and as a percentage of total energy used over the period of time. Power log 600 illustrates that application 601 consumes 5000 mW-sec of energy while running during the period of time, with 5000 mW-sec being 100% of the energy used by application 601 during this time. Of this 5000 mW-sec, 3000 mW-sec, or 60%, of the energy is used by process 610 and 2000 mW-sec, or 40%, is used by process 620. The 3000 mW-sec of process 610 can be further attributed to three sub-portions of process 610, sub-portions 612, 614, and 618. The energy used by sub-portion 614 may be even further accounted for by two sub-portions of sub-portion 614, sub-portions 615 and 616. The 2000 mW-sec used by process 620 can be similarly attributed to sub-portions 622 and 624. Of the 1800 mW-sec used by sub-portion 624, 1600 mW-sec are further attributed to API call 625 and to non-CPU resource GPS used by sub-portion 624. As can be seen, the usage of the GPS resource accounts for 30% of the total energy usage of application 601.

Utilizing this data, the developer may review code included in process 610 and 620, including the various sub-portions of these processes. Making software changes from application 601, the developer creates application 701, and generates power log 700, shown in FIG. 7, to evaluate how the software changes impacted the energy usage.

Power log 700 shows that the revised application 701 used 4000 mW-sec, saving 1000 mW-sec over application 601. Application 701 includes similar processes and sub-portions of these processes as application 601. Using power log 700, it may be observed that the 1000 mW-sec of energy savings is distributed fairly evenly across the processes and sub-processes of application 701, with 500 mW-sec being saved in each of process 710 and 720. Usage of the GPS resource is reduced by 400 mW-sec.

It is noted that illustrations in FIGS. 6 and 7 are examples of power logs that may be generated by a computer system with power logging capabilities. In other embodiments, energy usage from more than one application may be presented. The power data is presented in terms of energy usage. In other embodiments, an average power consumption over the period of time may be presented instead of, or in addition to, the energy usage data.

Figure 8:
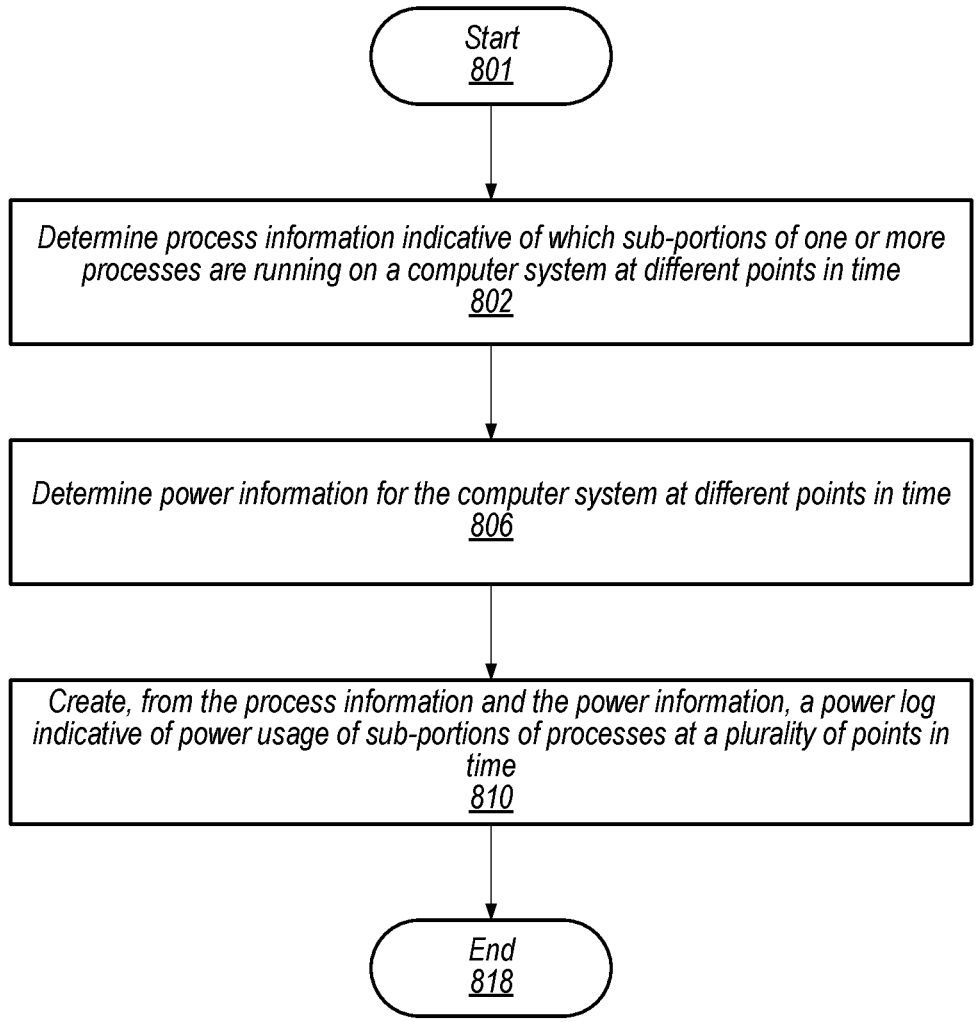
FIG. 8 shows a flow diagram of an embodiment of a method for logging power data by a computer system.

Block diagrams of computer systems and charts have been presented to describe the disclosed concepts. A method for utilizing the presented computer systems is now disclosed. Proceeding now to FIG. 8, a flow diagram of an embodiment of a method for logging power consumption in a computer system is depicted. In various embodiments, method 800 may be performed by computer system 100 or 200 in FIGS. 1 and 2, respectively. Referring collectively to FIGS. 2 and 8, method 800 begins in block 801.

An operating system of a computer system determines process information indicative of which sub-portions of one or more processes are running on the computer system at different points in time (block 802). Operating system 205, executing in CPU 201, performs synchronized stack traces at regular intervals in order to determine what sub-portions of processes 210 and 220 may be active in processing cores 202. The stack traces may include retrieving portions of process information from one or more of process information 230a-230d, stored in respective stacks of processing cores 202.

The operating system determines power information for the computer system at different points in time (block 806). Operating system 205 selects a particular power state for each of processing cores 202. Each power state may include a particular voltage level for one or more power signals providing power to respective processing cores 202 and/or a particular frequency for one or more clock signals sent to respective processing cores 202. A reduced power state, for example, may include a reduced voltage level for the one or more power signals and a reduced frequency for the one or more clock signals. In contrast, an increased performance power state may include increased voltage levels and frequencies for the respecting power signals and clock signals, allowing an increase in processing bandwidth for processing cores 202 in the increased performance state. In some embodiments, all processing cores 202 may be set to a same state, while in other embodiments, each of processing cores 202 may be independently placed into a particular power state. Operating system 205, as illustrated, stores power states for each of processing cores 202 in power information 240. Power state information may be logged in response to a change in a power state of one or more processing cores 202.

The operating system creates, using the process information and the power information, a power log indicative of power usage of sub-portions of processes at a plurality of points in time (block 810). For one or more stack traces, taken at consecutive points in time, operating system 205 determines a sub-portion of a process that corresponds to the process information received from the stack traces. Operating system 205 then determines a power state for the corresponding processing core 202 on which the determined sub-process was executing. Using the power state information, operating system 205 determines a power consumption value or an energy usage value. This energy usage value is stored in an entry of power log 250 along with an indication of the associated sub-portion of a corresponding process.

It is noted that Method 800 in FIG. 8 is one example of a power logging process for a computer system. In other embodiments, some operations may be performed in various other orders. Some embodiments may include additional operations. Additional details for generating an entry in a power log are now presented in FIG. 9.

Figure 9:
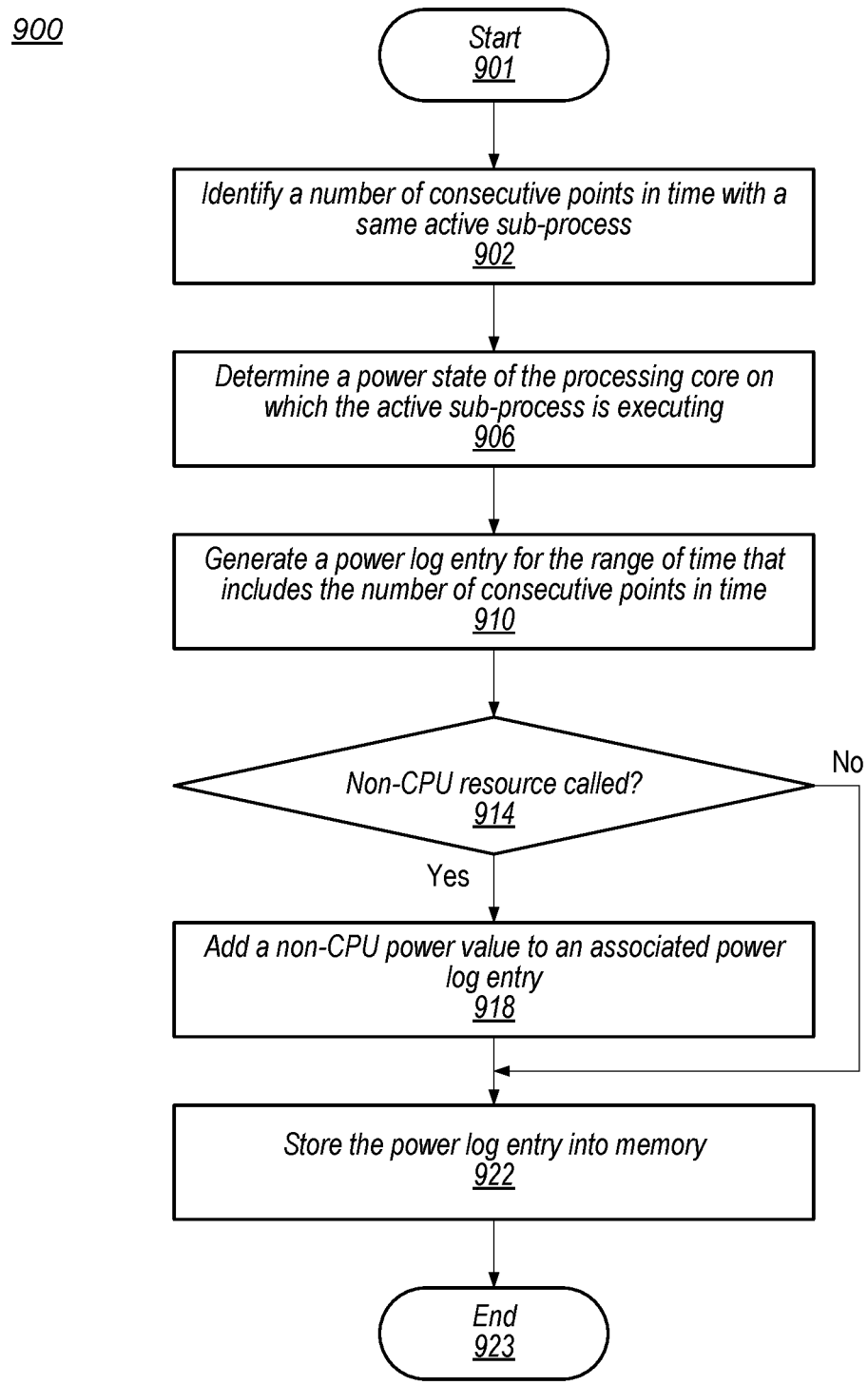
FIG. 9 illustrates a flow diagram of an embodiment of a method for generating an entry for a power log.

Proceeding now to FIG. 9, a flow diagram of an embodiment of a method for generating an entry in a power log is depicted. Method 900 may, in some embodiments, be performed as a part of method 800, in FIG. 8. In various embodiments, method 900 may be performed by computer system 100 or 200 in FIGS. 1 and 2, respectively. Referring collectively to FIGS. 2 and 9, method 900 begins in block 901.

An operating system identifies a number of consecutive points in time with a same active sub-process (block 902). Operating system 205 performs synchronous stack traces, using each stack trace to determine an active sub-portion of a process in one or more of processing cores 202 at consecutive points in time. Operating system 205, in the current embodiment, determines a number of consecutive points in time for which a particular sub-portion, e.g., sub-portion 214, is active in a particular core, e.g., processing core 202a.

The operating system determines a power state of the processing core on which the active sub-process is executing (block 906). For each of the identified consecutive points in time for which sub-portion 214 is active, operating system 205 determines a respective power state for processing core 202a. For example, if sub-portion 214 is active for 10 consecutive points in time, processing core 202a may be in a reduced power state for the first three, and in an increased performance state for the remaining seven. To retrieve power state information, operating system 205 retrieves power state data from power information 240 in memory 203.

The operating system generates a power log entry for the range of time that includes the number of consecutive points in time (block 910). Using the retrieved power state information, operating system 205 determines a power consumption value for each point in time. Operating system 205 may then determine an average power consumption value over a range in time that includes all of the consecutive points in time or may determine an energy used value for sub-portion 214 over the range in time. In some embodiments, both an average power consumption value and an energy used value may be determined. The determined value is combined with an identification value for sub-portion 214 to generate a power log entry.

Further operations of method 900 may depend on a call to an API for a non-CPU resource (block 914). The power log entry generated in block 910 corresponds to a CPU power value, since the power consumption values are based on the power state of processing core 202a. If a non-CPU resource, such as, for example, GPU 262, is called, then a non-CPU power value is determined. A non-CPU resource may be detected by a call to an API used to access the non-CPU resource, such as GPU API 272. APIs in API library 270 may include instructions for triggering an additional, asynchronous stack trace when the API is called. This asynchronous stack trace is used to identify a particular sub-portion that called the API. In some cases, the active sub-portion may call the API, while in other embodiments, a different sub-portion may activate for a short period of time, e.g., less that an interval between synchronous stack traces, and initiate the API call.

Depending on a particular non-CPU resource that is called, the non-CPU power value may correspond to a value read from a non-CPU resource power table, or may be determined using additional parameters associated with the non-CPU resource. An example of an additional parameter includes an amount of data sent to, processed by, and/or received from the non-CPU resource. Another example includes particular settings for the non-CPU resource that may be included in the API call, such as particular voltage level or frequency settings for the resource. If a non-CPU resource is called, then the method moves to block 918 to add a non-CPU power value to an associated power log entry. Otherwise the method moves to block 922 to store the power log entry generated in block 910.

If a non-CPU resource is called, then the operating system adds the power value to an associated power log entry (block 918). If sub-portion 214 is determined to be the calling sub-portion of GPU API 272, then a power value corresponding to the usage of GPU 262 is added to the power log entry determined in block 910. Otherwise, if a different sub-portion calls GPU API 272, then the GPU power value is added to an entry associated with the calling sub-portion. If a power log entry for the other sub-portion is not currently generated, e.g., the API call was made by a sub-portion that activate for less time than the interval between the consecutive points in time, then a new power log entry is created for the calling sub-portion.

The operating system stores the power log entry into memory (block 922). Once a power log entry has been generated, operating system 205 sends the entry to memory 203, where it is stored as part of power log 250. In some embodiments, a value in the power log entry may be compared to a threshold value. If the logged value satisfies the threshold (e.g., meets a particular set condition such as is greater than, or equal to, or is less than the threshold value) then operating system 205 may perform additional tasks, such as, for example, terminate execution of sub-portion 214 or process 210, or present a notification on a display of computer system 200 (not shown in FIG. 2), alerting a user of computer system 200 of the particular value. In such embodiments, the user may be presented with an option whether or not to terminate process 210. The method ends in block 923.

It is noted that method 900 is one example of how a power log entry may be generated. In other embodiments, additional operations may be included. Some operations may be performed in parallel or in a different order.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various embodiments described herein may gather and/or use data available from specific and legitimate sources to improve the delivery to users of invitational content or any other content that may be of interest to them. The present disclosure contemplates that, in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A method, comprising:
   determining, by an operating system of a computer system, first process information indicative of which sub-portions of one or more processes are running on the computer system at different points in time;
   determining, by the operating system at different points in time, that an application programming interface (API) of a non-core resource has been executed by the computer system;
   in response to determining the API has been executed, generating, by the operating system, second process information indicative of usage of the non-core resource;
   determining, by the operating system, power information for the computer system at different points in time;
   estimating, by the operating system using the first process information, second process information, and the power information, respective power usage values for individual ones of sub-portions of the one or more processes that are running at a plurality of different points in time; and creating, by the operating system, a power log using the power usage values.

2. The method of claim 1, wherein the power log is created to include an entry for a particular point in time, wherein the entry indicates power usage over a range of time that includes at least the particular point in time.

3. The method of claim 1, wherein creating a particular entry in the power log includes correlating the power information corresponding to a particular range in time with the first process information for the particular range in time.

4. The method of claim 3, wherein the power information includes stored voltage level and clock frequency information for one or more processing cores in the computer system.

5. The method of claim 4, wherein determining the power information for a particular processing core of the one or more processing cores during the particular range in time is based on the voltage level and clock frequency information for the particular processing core during the particular range in time.

6. The method of claim 1, wherein determining the first process information comprises determining, for a plurality of processing cores in the computer system, which sub-portions of the one or more processes are running on which of the plurality of processing cores.

7. The method of claim 1, wherein determining the first and second process information includes:
performing stack traces at regular intervals to determine the first process information that is associated with one or more cores included in the computer system; and
additionally, performing stack traces upon detecting a beginning and an end of usage of the non-core resource that is associated with the second process information.

8. The method of claim 7, wherein estimating the respective power usage values comprises:
estimating a first set of power usage values based on the first process information and the power information at the different points in time; and
adjusting ones of the first set of power usage values occurring during usage of the non-core resource based on an estimated power consumption of the non-core resource.

9. The method of claim 8, wherein the estimated power consumption is based on a parameter associated with the estimated power consumption of the non-core resource.

10. The method of claim 9, wherein the parameter is indicative of an amount of data specified in a call to the non-core resource.

11. The method of claim 1, further comprising sending, by the operating system, information in the power log to a database system external to the computer system, wherein the database system is configured to receive information from power logs of other computer systems.

12. An apparatus, comprising:
one or more processing cores;
one or more peripheral processing circuits; and
a memory storing instructions executable by the one or more processing cores to:
identify one or more active sub-portions of one or more processes that are running on the one or more processing cores at a first plurality of different points in time;
determine first power information for the one or more processing cores at different points in time;
determine, at a second plurality of different points in time, that an application programming interface (API) of a particular one of the peripheral processing circuits has been executed by a particular one of the one or more processing cores;
in response to determining the API has been executed, generate second power information indicative of usage of the particular peripheral processing circuit;
estimate, using the first and second power information, respective power usage values associated with the identified active sub-portions at a plurality of different points in time; and
maintain a power log that includes the estimated power usage values.

13. The apparatus of claim 12, wherein to estimate the respective power usage values, the instructions are further executable to:
estimate a first set of power usage values based on the first power information at the different points in time; and
using an estimated power consumption for the particular peripheral processing circuit, adjust ones of the first set of power usage values that correspond to usage of the particular peripheral processing circuit.

14. The apparatus of claim 12, wherein the one or more peripheral processing circuits include at least one circuit selected from the group consisting of: a global positioning system (GPS) receiver circuit, a cellular radio circuit, a Bluetooth radio circuit, a WiFi radio circuit, a graphics processing unit (GPU), a digital signal processor (DSP).

15. The apparatus of claim 12, wherein the instructions are executable to:
perform stack traces at regular intervals to identify the one or more active sub-portions; and
perform additional stack traces in response to a detection of a beginning and of an end of usage of the particular peripheral processing circuit.

16. The apparatus of claim 12, wherein the instructions are executable to provide an interface that permits selection of the one or more peripheral processing circuits for which power information is to be tracked.

17. A non-transitory computer-readable medium having instructions stored thereon that are executable by a computer system to perform operations comprising:
determining process information indicative of which functions within one or more processes are running on a plurality of processor cores in the computer system at different points in time;
determining a first set of power information indicative of power consumption of each of the plurality of processor cores at different points in time;
determining, at different points in time, that an application programming interface (API) of a peripheral processing circuit has been executed by the computer system;
in response to determining the API has been executed, generating a second set of power information that estimates power consumption of the peripheral processing circuit;
correlating the process information with the first and second sets of power information to estimate respective power usage values for the running functions at a plurality of different points in time; and
generate, using the power usage values, a power log for the computer system.

18. The non-transitory computer-readable medium of claim 17, wherein estimation of power consumption of the particular peripheral processing circuit is weighted based on an amount of data specified in a call to the peripheral processing circuit.

19. The non-transitory computer-readable medium of claim 17, wherein the operations further include enabling a code section corresponding to the peripheral processing circuit to call a power estimation function that estimates the second set of power information, wherein selection of the peripheral processing circuit is user-configurable.

20. The non-transitory computer-readable medium of claim 17, wherein the operations further include providing a user-visible indication of a process that exceeds a power threshold.

\* \* \* \* \*